(12) United States Patent
Hodgson et al.

(10) Patent No.: US 8,066,951 B2
(45) Date of Patent: Nov. 29, 2011

(54) METHOD FOR REMOVING SOOT PARTICLES FROM AN EXHAUST GAS, ASSOCIATED COLLECTING ELEMENT AND SYSTEM

(75) Inventors: Jan Hodgson, Neunkirchen-Seelschied (DE); Rolf Brück, Bergisch Gladbach (DE); Meike Reizig, Erpel (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/751,536

(22) Filed: Mar. 31, 2010

(65) Prior Publication Data
US 2010/0186380 A1 Jul. 29, 2010

Related U.S. Application Data

(60) Division of application No. 10/281,003, filed on Oct. 25, 2002, now Pat. No. 7,727,498, and a continuation of application No. PCT/EP01/04486, filed on Apr. 20, 2001.

(30) Foreign Application Priority Data

Apr. 25, 2000 (DE) .................................. 100 20 170

(51) Int. Cl.
 *B01D 50/00* (2006.01)
(52) U.S. Cl. ....................................................... 422/180
(58) Field of Classification Search .................. 422/177, 422/172, 180, 211, 212; 502/527.18, 527.19, 502/527.24, 439; 423/215.5; 55/525
See application file for complete search history.

(56) References Cited

U.S. PATENT DOCUMENTS

| 4,240,814 A | 12/1980 | Regehr et al. |
| 4,597,262 A | 7/1986 | Retallick |
| 4,902,487 A | 2/1990 | Cooper et al. |
| 4,987,034 A | 1/1991 | Hitachi et al. |

(Continued)

FOREIGN PATENT DOCUMENTS

DE 2738257 B1 11/1978

(Continued)

OTHER PUBLICATIONS

Jelles, Styse J., "Diesel Exhaust Aftertreatment"—Development of catalytic systems for diesel particulate oxidation, ODONPL, 32 pages, Nov. 25, 1999.

*Primary Examiner* — Tom Duong
(74) *Attorney, Agent, or Firm* — Laurence A. Greenberg; Werner H. Stemer; Ralph E. Locher

(57) ABSTRACT

A method for removing soot particles from an exhaust gas of an internal combustion engine, especially of a diesel engine, includes feeding the exhaust gas through a collecting element through which the exhaust gas can pass freely but which is provided with a plurality of deflections and/or zones of swirl and calming or stabilization. At least a proportion of the particles are held or swirled around in the collecting element until there is a sufficient probability of reaction with nitrogen dioxide and a majority of the collected particles have been removed. A collecting element has flow channels through which the exhaust gas can pass freely. However, the flow channels are configured in such a way as to form deflections or zones of swirl and calming or stabilization. A system having the collecting element is also provided.

25 Claims, 2 Drawing Sheets

U.S. PATENT DOCUMENTS

| | | | |
|---|---|---|---|
| 5,045,403 | A | 9/1991 | Maus et al. |
| 5,130,208 | A | 7/1992 | Maus et al. |
| 5,162,287 | A | 11/1992 | Yoshimoto et al. |
| 5,294,411 | A | 3/1994 | Breuer et al. |
| 5,403,559 | A | 4/1995 | Swars |
| 5,436,216 | A | 7/1995 | Toyao et al. |
| 5,506,028 | A | 4/1996 | Brück |
| 5,839,273 | A * | 11/1998 | Maus ........................... 60/274 |
| 5,976,475 | A | 11/1999 | Peter-Hoblyn et al. |
| 6,190,784 | B1 | 2/2001 | Maus et al. |
| 6,214,305 | B1 | 4/2001 | van Harderveld et al. |
| 6,294,141 | B1 | 9/2001 | Twigg et al. |
| 6,516,610 | B2 | 2/2003 | Hodgson |
| 6,534,021 | B1 | 3/2003 | Maus |

FOREIGN PATENT DOCUMENTS

| | | | |
|---|---|---|---|
| DE | 3341177 | A1 | 4/1984 |
| DE | 3723478 | A1 | 1/1989 |
| DE | 4206812 | A1 | 9/1992 |
| DE | 4203807 | A1 | 8/1993 |
| DE | 19704147 | A1 | 8/1998 |
| DE | 19734627 | C1 | 1/1999 |
| DE | 69616382 | T2 | 7/2002 |
| EP | 0244798 | A1 | 11/1987 |
| EP | 0298943 | A2 | 1/1989 |
| EP | 0369163 | A1 | 5/1990 |
| EP | 0393257 | A1 | 10/1990 |
| EP | 0341832 | B1 | 1/1996 |
| EP | 0835684 | A2 | 4/1998 |
| EP | 0896831 | A1 | 2/1999 |
| EP | 1072765 | A2 | 1/2001 |
| JP | 4279714 | A | 10/1992 |
| JP | 11125110 | A | 5/1999 |
| WO | 9012950 | A1 | 11/1990 |
| WO | 9101178 | A1 | 2/1991 |
| WO | 9101807 | A1 | 2/1991 |
| WO | 9320339 | A1 | 10/1993 |
| WO | 9502655 | A1 | 1/1995 |
| WO | 9749905 | A1 | 12/1997 |
| WO | 0112301 | A1 | 2/2001 |

* cited by examiner

METHOD FOR REMOVING SOOT PARTICLES FROM AN EXHAUST GAS, ASSOCIATED COLLECTING ELEMENT AND SYSTEM

CROSS-REFERENCE TO RELATED APPLICATION

This application is a divisional application of application Ser. No. 10/281,003 filed Oct. 25, 2002, which is a continuation of copending International Application No. PCT/EP01/04486, filed Apr. 20, 2001, which designated the United States and was not published in English. This application also claims the priority, under 35 U.S.C. §119, of German Patent Application DE 100 20 170.9, filed Apr. 25, 2000; the prior applications are herewith incorporated by reference in their entirety.

BACKGROUND OF THE INVENTION

Field of the Invention

The invention relates to a method for removing soot particles from an exhaust gas, in particular of an internal combustion engine. The invention also relates to a collecting element suitable for that purpose, in particular one which can be regenerated and can be installed in a pipe, e.g. in an exhaust line of a motor vehicle. The invention additionally relates to a system having a collecting element.

In addition to gaseous constituents, the exhaust gas of an internal combustion engine also contains particles. Those particles enter the environment directly with the exhaust gas, which is undesirable, or they are often deposited somewhere in the exhaust system, with the result that they are then emitted in the form of a cloud of particles in the case of load changes, for example.

It is conventional to use filters to collect the particles. However, the use of closed filter systems entails two significant disadvantages: on one hand, those filters can become clogged and, on the other hand, they cause an unwanted pressure drop. If no filters are used, those particles which do not pass directly into the environment may be deposited on the coating of an installed catalytic converter which is provided for purifying the exhaust gas of other polluting components, where they lead to poisoning or at least to a reduction in the catalytically active surface area. As part of ever-stricter laws to protect the environment, emissions of pollutants and particles are to be reduced further. In addition to the removal of particles, the reduction of nitrogen oxides also plays an important part in exhaust-gas purification. German Published, Non-Prosecuted Patent Application DE 42 03 807 A1 has disclosed a device for that purpose, in which an oxidizing agent is injected and mixed with the exhaust gas.

SUMMARY OF THE INVENTION

It is according an object of the invention to provide a method for removing soot particles from an exhaust gas, an associated collecting element and a system for particles in an exhaust-gas flow, which overcome the hereinafore-mentioned disadvantages of the heretofore-known methods and devices of this general type.

With the foregoing and other objects in view there is provided, in accordance with the invention, a method for removing soot particles from an exhaust gas of an internal combustion engine, in particular a diesel engine, which comprises providing a collecting element for freely conducting the exhaust gas. The collecting element has a multiplicity of deflections and/or swirl-inducing and calming zones. The exhaust gas is fed through the collecting element. At least some of the particles are retained or swirled around long enough to ensure an adequate probability of a reaction with nitrogen dioxide present in the exhaust gas until largely eliminating the collected particles.

With the objects of the invention in view, there is also provided a collecting element for collecting soot particles from an exhaust gas flowing through the collecting element. The collecting element comprises flow paths for freely conducting the exhaust gas. The flow paths have deflections or swirl-inducing and calming zones.

In tests with mixing elements of the type described in International Publication No. WO 91/01807, corresponding to U.S. Pat. Nos. 5,045,403 and 5,130,208 or International Publication No. WO 91/01178, corresponding to U.S. Pat. No. 5,403,559, for example, which were tested with the aim of better distribution of additives injected into exhaust systems, it has surprisingly been found that such elements can also lead to a reduction in soot particles. The particles are thought to be retained by virtue of the swirling within the mixing elements, which occurs at deflection points in the flow, or are as it were washed against the walls within the mixing element (an effect comparable to gravitational separation) and then stick firmly. A possible metal/soot interaction and/or an exhaust-gas/duct-wall temperature gradient may also play a part in the sticking of the particles. Pronounced agglomeration of the particles, especially in the case of uncoated and metallic walls, is also observed. The present invention makes use of these insights by configuring a collecting element in such a way that soot particles are retained there long enough to ensure an adequate probability of a reaction with the nitrogen dioxide present in the exhaust gas.

The route taken is therefore not the usual one of filtering out 100% of the soot particles, as it were forcibly, through the use of porous walls or the like but simply that of increasing the probability of a reaction between soot particles and nitrogen dioxide by extending the dwell time of the soot particles in the collecting element. This is accomplished, while maintaining flow paths that are freely traversable per se, through the use of a sufficient number of swirl-inducing and calming or stabilization zones and/or through the use of deflections or deviations which promote deposition of the particles on the walls. While a particle flowing with the flow of exhaust gas has little chance of reacting with other constituents of the exhaust gas, its chances of doing so dramatically increase if the particle is retained in a swirl-inducing zone or is deposited on a wall. All nitrogen dioxides passing by may then take part in a reaction and thus quickly break down the soot particles. The collecting element can therefore not become clogged but is instead continuously regenerated.

A zone in the duct with a low flow velocity is referred to as a calming zone, and a zone in which there is no fluid motion is referred to as a dead zone.

The collecting element is referred to as being freely traversable in contrast to closed systems because there are no dead ends for the flow. As a result, the collecting element cannot become clogged like a conventional filter system, where pores can become blocked, because the flow will entrain the particles before that happens. At the same time, it is particularly advantageous that the deflections are configured in such a way that about 2% to 15% of the particles still contained by the exhaust gas are thrown against the walls of the collecting element in each case. A preferred range is between 4% and 8%. The phrase "particles still contained by the exhaust gas" takes into account the fact that the quantity of particles decreases in the direction of flow and with relatively frequent deflection of the flow of exhaust gas. For this purpose, the number of deflections should, in particular, be chosen in such a way that, at least statistically, the entire flow of exhaust gas is guided against the walls of the collecting element. The quantity limitation on the impinging particles or on the flow of exhaust gas to be deflected has the advantage that only a very small pressure drop occurs across the collecting element.

A conical system is preferred in order to cover various (dynamic) load cases of the drive system of a motor vehicle. Such systems, as described in International Publication No. WO 93/20339, corresponding to U.S. Pat. No. 5,506,028, for example, have widening ducts. That inevitably gives rise to particularly favorable conditions for the collection of particles at any mass flow rate at any point of the ducts if they are provided with appropriate deflecting or swirl-inducing structures.

The preferred material for the collecting element is metal, but it can also be an inorganic (ceramic, fiber material), organic or organometallic plastic and/or a sintered material. The walls of the collecting element can be coated with a wash coat and/or catalytically active material or can be uncoated.

The wall thickness is preferably in a range of between 0.02 and 0.11 mm, particularly preferably between 0.04 and 0.08 mm.

The cell densities (number of ducts per unit of cross-sectional area) of a collecting element are preferably in a range of from 25 to 1000 cells per square inch (cpsi), preferably between 200 and 400 cpsi.

A typical collecting element has 200 cpsi, for example, a volume of about 0.5 to 0.8 liters per 100 kW and a geometrical surface area of 1 to 2 $m^2$ per 100 kW in relation to a diesel engine. Deflecting or swirl-inducing structures are at intervals of 3 to 20 mm in the flow paths.

The collecting element can be regenerated continuously or periodically. It is possible, in the case of a diesel-engine exhaust line, for regeneration to be achieved by oxidation of the soot either through the use of nitrogen dioxide ($NO_2$) at a temperature above about 250° C. or thermally with air or oxygen ($O_2$) at a temperature>500° C. and/or by injection of an additive (e.g. cerium).

Soot oxidation through the use of $NO_2$, using the mechanism of the continuous regeneration trap (CRT), for example, as follows:

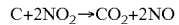

$$C+2NO_2 \rightarrow CO_2+2NO$$

requires that an oxidation catalytic converter be placed upstream of the collecting element in the exhaust line to oxidize an adequate amount of the NO to $NO_2$. Studies have shown that up to twice the amount, preferably 1.2 times the amount (corresponding to about 2.4 mol), of $NO_2$ should be fed into the collecting element as being required for complete stoichiometric soot oxidation. However, the quantity ratio of the reaction partners also depends significantly on the mixing of the fluids and therefore different quantity ratios should also be used, depending on the configuration of the collecting element.

In the case of various embodiments, the collecting element can have many other desired side effects when installed in a motor-vehicle exhaust line, for example:

According to one embodiment, the collecting element has the function not only of removing particles but also of mixing the exhaust gas with another fluid, mixing diesel exhaust gas with ammonia or urea solution for reduction, for example, as when using the SCR (selective catalytic reduction) method, for example. For this purpose, the collecting element is combined with at least one additive feed.

The distribution of the flow of the fluid flowing through is also optimized, for subsequent feeding into a reduction catalytic converter, for example, through the use of an advantageous refinement of the collecting element. According to one embodiment, the collecting element is used in combination with an upstream additive feed.

According to one embodiment, the collecting element is used in combination with at least one catalytic converter. Suitable catalytic converters and/or precatalytic converters to be used for this purpose are, in particular: oxidation catalytic converters, heated catalytic converters with an upstream or downstream heating disk, hydrolysis catalytic converters and/or reduction catalytic converters. The oxidation catalytic converters being used include those which oxidize the $NO_x$ (nitrous gases) to nitrogen dioxide ($NO_2$) as well as those which oxidize the hydrocarbons and carbon monoxide to $CO_2$. The catalytic converters are tubular or conical.

It is also advantageous to combine the collecting element with at least one catalytic converter and at least one turbocharger or to combine a collecting element with a turbocharger. The collecting element downstream of the turbocharger can be disposed close to the engine or in an underfloor position.

The collecting element is also used in combination with an upstream or downstream soot filter. It is possible for the downstream soot filter to be substantially smaller than a conventional soot filter because it only has to offer an additional safeguard, ensuring that particulate emissions are eliminated. A filter with an area of 0.5 to 1 $m^2$ per 100 kW of a diesel engine is sufficient, for example, whereas filter sizes of about 4 $m^2$ per 100 kW are required without a collecting element.

The following examples give configurations that demonstrate the large number of possible combinations of the collecting element with catalytic converters, turbochargers, soot filters and an additive feed along an exhaust line of a motor vehicle:

A) Oxidation catalytic converter-turbocharger-collecting element. It is possible for the collecting element to be disposed close to the engine or in an underfloor position.

B) Precatalytic converter-collecting element-turbocharger.

C) Oxidation catalytic converter-turbocharger-oxidation catalytic converter/collecting element.

D) Heated catalytic converter-first collecting element-second collecting element (in which the first collecting element and the second collecting element may be the same or different).

E) First collecting element-conical opening of the exhaust line-second collecting element.

F) Additive feed-collecting element-hydrolysis catalytic converter-reduction catalytic converter.

G) Precatalytic converter-oxidation catalytic converter-additive feed (possibly soot filter)-collecting element, e.g. in conical form, if required with hydrolysis coating-(possibly soot filter)-(possibly conical to increase the cross section of the tube) reduction catalytic converter.

The collecting element can have various coatings, each of which determine one function, depending on the embodiment. In addition to the storage, mixing and flow-distribution function, the collecting element can also act as a hydrolysis catalytic converter, for example.

Other features which are considered as characteristic for the invention are set forth in the appended claims.

Although the invention is illustrated and described herein as embodied in a method for removing soot particles from an exhaust gas, an associated collecting element and a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
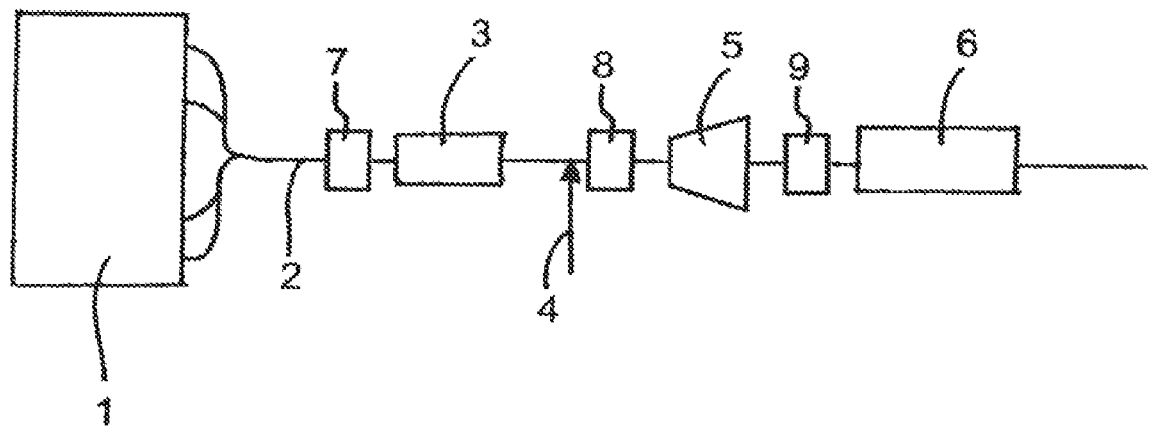
FIG. 1 is a block diagram of an exhaust system of an internal combustion engine.

Referring now to the figures of the drawings in detail and first, particularly, to FIG. 1 thereof, there is seen an internal combustion engine 1, in particular a diesel engine, the exhaust gases of which are fed into an exhaust line 2. The exhaust line has at least one oxidation catalytic converter 3, which can also be preceded by a non-illustrated precatalytic converter disposed very close to the outlet of the internal combustion engine. A turbocharger 7 can also be disposed in that region. Alternatively, a turbocharger 8 or 9 can be used. An infeed 4 for an additive, in particular urea, is furthermore disposed further downstream in the exhaust line 2. A collecting element 5 according to the invention is disposed downstream of the infeed 4 and is followed, in turn, by an SCR catalytic converter 6. The collecting element 5 is illustrated as being conical, but could be tubular.

Figure 2:
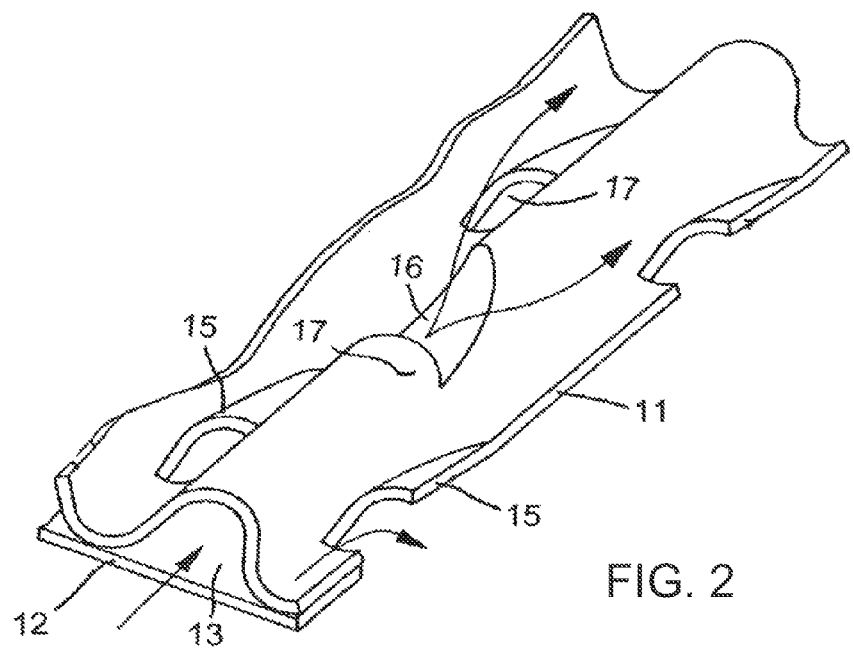
FIG. 2 is a fragmentary, diagrammatic, perspective view of an embodiment of a collecting element according to the invention.

FIG. 2 shows a small portion of an exemplary embodiment of a collecting element 5 according to the invention. The collecting element is constructed from structured sheet-metal layers 11 and smooth sheet-metal layers 12. The layers 11, 12 define freely traversable flow paths 13 which are, however, provided with deflections 15, 16 due to a special construction of the structured sheet-metal layers 11. These deflections impart a swirl to the exhaust gas, as a result of which particles stay in the collecting element 5 longer and can react more easily with other components of the exhaust gas. Depending on the precise configuration of the deflections 15, 16, they may also throw particles against the walls of the flow paths 13 formed by the sheet-metal layers 11, 12, where they stick. The deflections 15, 16 have aperture angles or angles of incidence of 20° to 90°, for example. The larger the angle of incidence to the direction of flow, the greater the deflection and swirling which is achieved, although it is associated with an exponential rise in the pressure loss. The optimum angle is between 40° and 50°, which provides a good swirl for an acceptable pressure loss. The deflections 15, 16 are preferably combined with openings 17 in the structured sheet-metal layers 11, giving rise to more powerful vortices and ensuring that the flows in adjacent flow paths 13 mix.

Figure 3:
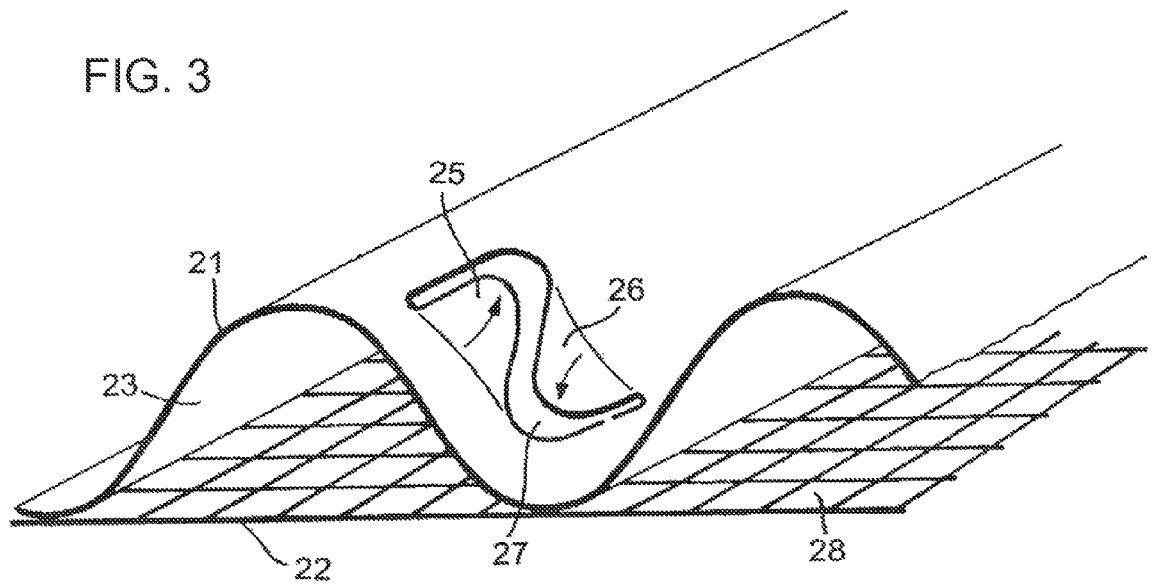
FIG. 3 is a fragmentary, perspective view of another exemplary embodiment of a collecting element according to the invention.

Another exemplary embodiment is illustrated in FIG. 3, again only as a small portion of a collecting element 5. The collecting element is constructed from a structured sheet-metal layer 21 and a smooth sheet-metal layer 22 with apertures 28. The layers 21, 22 define freely traversable flow paths 23. Wing-like deflections 25, 26 in combination with curved openings 27 lead to the same effects as those described above. The apertures 28 in the smooth sheet-metal layers 22 assist in the formation of vortices and the mixing of exhaust gases in the collecting element.

It has been observed that the deposition of particles takes place especially in the region of the inlet and outlet surfaces of the collecting elements. Therefore, in accordance with one embodiment, the collecting element is employed in the form of a plurality of narrow honeycomb bodies as disk elements connected in series. This produces deflections and/or swirl in the inlet and outlet region of each disk. Up to 10 elements is the preferred number.

The present invention proposes a collecting system for soot particles which can replace conventional filter systems and provides major advantages as compared with those systems:

On one hand, it cannot become clogged, and the pressure drop caused by the system does not increase as rapidly over its operating life as with filter systems because the particles stick outside the flow of fluid. On the other hand, it causes comparatively small pressure losses because it is an open system.

The invention claimed is:

1. A collecting element for collecting soot particles from an exhaust gas flowing through the collecting element, the collecting element comprising:
   free and uncloggable flow paths defined by structured sheet metal layers and smooth sheet metal layers for freely conducting the exhaust gas, said flow paths having at least one of deflections and swirl-inducing and calming zones.

2. The collecting element according to claim 1, further comprising at least one metallic honeycomb body having said sheet-metal layers.

3. The collecting element according to claim 2, further comprising obstacles in said flow paths.

4. The collecting element according to claim 3, wherein said sheet-metal layers define walls of said flow paths, and at least one of said obstacles and said deflections each throw between 2% and 15% of the particles still contained by the exhaust gas against said walls.

5. The collecting element according to claim 4, further comprising a coating on at least some of said walls of said flow paths.

6. The collecting element according to claim 4, further comprising a wash coat of aluminum oxide on at least some of said walls of said flow paths.

7. The collecting element according to claim 1, further comprising a conical housing containing said flow paths.

8. The collecting element according to claim 1, wherein said flow paths have at least one of openings and apertures for ensuring the mixing of flows in adjacent ones of said flow paths.

9. The collecting element according to claim 1, wherein said flow paths are configured for at least one of retaining at least some of the particles and swirling around at least some of the particles long enough to ensure an adequate probability of a reaction with nitrogen dioxide present in the exhaust gas until substantially eliminating the particles.

10. An engine and exhaust system, comprising:
   an internal combustion engine;
   an exhaust line connected to said internal combustion engine; and
   at least one collecting element in said exhaust line for collecting soot particles from exhaust gas flowing through said at least one collecting element, said at least one collecting element including free and uncloggable flow paths defined by structured sheet metal layers and smooth sheet metal layers for freely conducting the exhaust gas, said flow paths having at least one of deflections and swirl-inducing and calming zones.

11. The system according to claim 10, wherein said internal combustion engine is a diesel engine.

12. An exhaust system, comprising:
   a collecting element for collecting soot particles from an exhaust gas flowing through said collecting element, said collecting element including free and uncloggable flow paths defined by structured sheet metal layers and smooth sheet metal layers for freely conducting the exhaust gas, said flow paths having at least one of deflections and swirl-inducing and calming zones; and
   at least one additive feed communicating with said collecting element.

13. The system according to claim 12, wherein said at least one additive feed is disposed upstream of said collecting element.

14. The system according to claim 12, wherein said at least one additive feed is disposed downstream of said collecting element.

15. An exhaust system, comprising:
   a collecting element for collecting soot particles from an exhaust gas flowing through said collecting element, said collecting element including free and uncloggable flow paths defined by structured sheet metal layers and smooth sheet metal layers for freely conducting the exhaust gas, said flow paths having at least one of deflections and swirl-inducing and calming zones; and
   at least one catalytic converter communicating with said collecting element.

16. The system according to claim 15, wherein said at least one catalytic converter includes at least one oxidation catalytic converter oxidizing nitrous gases to yield nitrogen dioxide.

17. The system according to claim 16, wherein said at least one oxidation catalytic converter is disposed upstream of said collecting element.

18. The system according to claim 16, wherein said at least one oxidation catalytic converter is disposed downstream of said collecting element.

19. An exhaust system for an internal combustion engine, comprising:
   a collecting element for collecting soot particles from an exhaust gas flowing through said collecting element, said collecting element including free and uncloggable flow paths defined by structured sheet metal layers and smooth sheet metal layers for freely conducting the exhaust gas, said flow paths having at least one of deflections and swirl-inducing and calming zones; and
   at least one turbocharger communicating with said collecting element.

20. The system according to claim 19, wherein said collecting element is mounted close to the engine.

21. The system according to claim 19, wherein said collecting element is mounted in an underfloor position.

22. The system according to claim 19, wherein said collecting element is mounted in an underfloor position close to the engine.

23. The system according to claim 19, wherein said at least one turbocharger is disposed downstream of said collecting element.

24. The system according to claim 19, wherein said at least one turbocharger is disposed upstream of said collecting element.

25. The system according to claim 19, wherein the engine is a diesel engine, an exhaust line is connected to the diesel engine, said at least one turbocharger is connected in said exhaust line upstream of said collecting element, and an oxidation catalytic converter is connected in said exhaust line downstream of said at least one turbocharger.

* * * * *